United States Patent
Koike et al.

(10) Patent No.: US 8,356,833 B2
(45) Date of Patent: Jan. 22, 2013

(54) AIRBAG DEVICE AND PRODUCTION METHOD THEREOF

(75) Inventors: Masahiro Koike, Shizuoka (JP); Kazuyuki Yamamoto, Shizuoka (JP)

(73) Assignee: Nihon Plast Co., Ltd., Fuji-shi (JP)

( * ) Notice: Subject to any disclaimer, the term of this patent is extended or adjusted under 35 U.S.C. 154(b) by 414 days.

(21) Appl. No.: 12/626,008

(22) Filed: Nov. 25, 2009

(65) Prior Publication Data

US 2010/0133790 A1  Jun. 3, 2010

(30) Foreign Application Priority Data

Nov. 28, 2008 (JP) .................................. 2008-303684

(51) Int. Cl.
*B60R 21/231* (2011.01)
*B60R 21/232* (2011.01)

(52) U.S. Cl. ...................... 280/728.1; 280/730.2; 156/60

(58) Field of Classification Search ............... 156/60; 280/730.2, 728.1; 222/146.2, 146.3, 146.4, 222/146.5; *B60R 21/232, 21/262, 21/231, B60R 21/214, 21/23, 21/16*
See application file for complete search history.

(56) References Cited

U.S. PATENT DOCUMENTS

| 7,654,560 B2 * | 2/2010 | Yokoyama et al. ........... 280/729 |
| 2008/0030011 A1 * | 2/2008 | Ishikawa et al. ........... 280/730.2 |

FOREIGN PATENT DOCUMENTS

| JP | 2000-335351 A | 12/2000 |
| JP | 2006-168687 A | 6/2006 |

* cited by examiner

*Primary Examiner* — Joseph Rocca
*Assistant Examiner* — Keith Frisby
(74) *Attorney, Agent, or Firm* — Marvin A. Motsenbocker; Mots Law, PLLC

(57) ABSTRACT

An airbag is formed of two base fabrics. An adhesive agent is pasted with some width on one of the base fabrics and then another of the base fabrics is put on the one of the base fabrics. The two fabrics are adhered together to form the airbag. Pasting start/end portions of the adhesive agent is set at a gas introducing portion of the airbag. Pasting start/end points (terminal ends of the start/end portions) is located outside a path in the gas introducing portion through which a gas is introduced into an inside of the airbag. According to an airbag with the airbag, assembling workability of the airbag can be improved.

6 Claims, 2 Drawing Sheets

AIRBAG DEVICE AND PRODUCTION METHOD THEREOF

BACKGROUND OF THE INVENTION

1. Field of the Invention

The present invention relates to an airbag device and a production method of the airbag device.

2. Description of Related Art

An airbag to be installed in an automobile is disclosed in Japanese Patent Application Laid-Open No. 2000-335351 (Patent Document 1). The airbag is made of two base fabrics. Circumferential edges of the two base fabrics are adhered with some width and then the two base fabrics are adhered together to form the airbag. The airbag disclosed in the Patent Document 1 includes an inflating portion inside the adhered edges and a gas introducing portion is formed at a part of the inflating portion into which a gas introducing pipe is inserted.

In this case, adhesive agent pasted along the circumferential edges of the two base fabrics must be discontinued at the gas introducing portion. Therefore, the gas introducing portion generally set as a start point and an end point for pasting the adhesive agent.

SUMMARY OF THE INVENTION

However, according to the above-mentioned conventional airbag, the adhesive agent tends to be heaped to form lumps at the start point and the end point. As a result, an opening width of the gas introducing portion is made narrowed due to the lumps and thereby workability for inserting the gas introducing pipe into the gas introducing portion gets worse. Due to that, assembling workability of the airbag also gets worse.

Therefore, it is an object of the present invention to provide an airbag device that can improve its assembling workability and to provide a production method of the airbag.

A first aspect of the present invention provides an airbag device with an airbag that includes a gas introducing portion in which a path is formed (a gas introducing member is to be inserted into the path) and an inflating portion communicated with the gas introducing portion. Here, the airbag is formed of first and second base fabrics that are adhered together with an adhesive agent pasted along a circumferential edge of the inflating portion and the path. In addition, a pasting end of the adhesive agent is set at the gas introducing portion and a terminal end of the pasting end is located outside the path.

According to the first aspect of the present invention, since the terminal end of the pasting end is located outside the path, it can be prevented that a lump of the adhesive agent is not located within the path of the gas introducing portion even when the lump were made at the terminal end (a pasting start/end point). Therefore, it can be prevented that an opening width of the gas introducing portion is narrowed. As a result, the lump doesn't infect the insertion of the gas introducing member into the gas introducing portion and smooth insertion workability of the gas introducing member can be secured.

It is preferable that the terminal end is located outside at least one of the first and second base fabrics.

According to this configuration, since the terminal end of the adhesive agent is located outside at least one of the first and second base fabrics, the lump doesn't exist on the airbag at all or exists away from the path. Therefore, improved appearance of the airbag can be secured in addition to the smooth insertion workability of the gas introducing member.

A second aspect of the present invention provides a production method of an airbag device with an airbag that includes a gas introducing portion in which a path is formed (a gas introducing member is to be inserted into the path) and an inflating portion communicated with the gas introducing portion. The airbag is formed of first and second base fabrics that are adhered together with an adhesive agent pasted along a circumferential edge of the inflating portion and the path. The production method comprises: setting a pasting end of the adhesive agent at the gas introducing portion, the pasting end being to be one of a pasting start portion and a pasting end portion of the adhesive agent, starting, when the pasting end of the adhesive is the pasting start portion, pasting of the adhesive agent from a position outside a portion to form the path on one of the first and second base fabrics on which the adhesive agent is to be pasted, and terminating, when the pasting end of the adhesive is the pasting end portion, pasting of the adhesive agent at a position outside the portion to form the path on one of the first and second base fabrics on which the adhesive agent is pasted.

According to the second aspect of the present invention, since the terminal end of the pasting end is located outside the path, it can be prevented that a lump of the adhesive agent is not located within the path of the gas introducing portion even when the lump were made at the terminal end (a pasting start/end point). Therefore, it can be prevented that an opening width of the gas introducing portion is narrowed. As a result, the lump doesn't infect the insertion of the gas introducing member into the gas introducing portion and smooth insertion workability of the gas introducing member can be secured.

It is preferable that at least one of the pasting start portion and the pasting end portion that is set as the pasting end at the gas introducing portion is located outside at least one of the first and second base fabrics.

According to this configuration, since the terminal end of the adhesive agent is located outside at least one of the first and second base fabrics, the lump doesn't exist on the airbag at all or exists away from the path. Therefore, improved appearance of the airbag can be secured in addition to the smooth insertion workability of the gas introducing member.

DETAILED DESCRIPTION OF THE EMBODIMENT

Hereinafter, an airbag device of an embodiment according to the present invention will be explained with reference to drawings.

An airbag in the present embodiment is formed by attaching two base fabrics together and adopted as a curtain airbag, which deploys along an inner side surface of a vehicle compartment.

Figure 1:
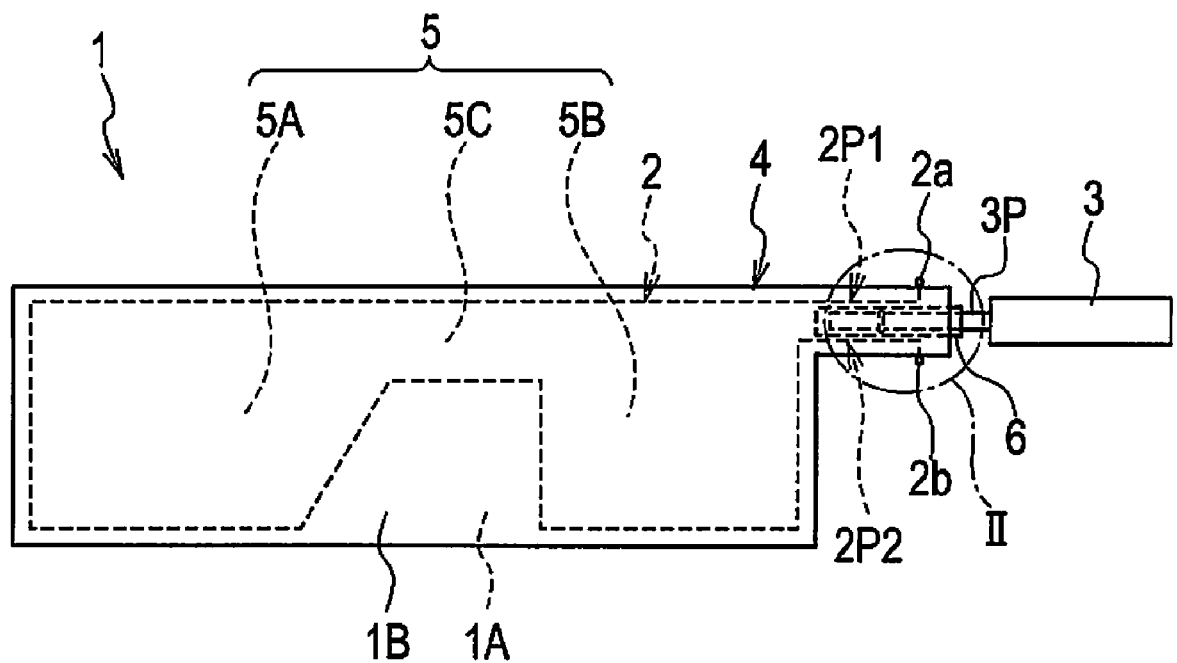
FIG. 1 shows a side view of an airbag device according to an embodiment of the present invention with an inflator being attached thereto.

As shown in FIG. 1, the curtain airbag 1 is composed of two base fabrics 1A and 1B (a first base fabric 1A and a second base fabric 1B) that have been cut to form predetermined shapes. Adhesive agent 2 (see FIG. 2) is pasted on at least one of the base fabrics 1A and 1B and then the base fabrics 1A and 1B are adhered together to form the curtain airbag 1. A gas introducing portion 4 and an inflating portion 5 are formed while adhering the base fabrics 1A and 1B. In the gas introducing portion 4, a path 4a into which a gas introducing pipe (gas introducing member) 3P of an inflator 3 is inserted is formed. The inflating portion 5 communicates with the gas introducing portion 4 and fills a large area of a main center portion of the base fabrics 1A and 1B.

Namely, the curtain airbag 1 will deploy along an inner surface of a vehicle compartment (generally, along an inner surface of a side glass of a front or rear door) to reduce an impact to a head and a shoulder of an occupant upon the head and shoulder contacting with the side door. Therefore, the curtain airbag 1 has a long shape in a longitudinal direction of a vehicle and the gas introducing portion 4 is located at an upper rear end of the curtain airbag 1. In addition, the inflating portion 5 composed of a front inflating portion 5A for a front occupant and a rear inflating portion 5B for a rear occupant. The both inflating portion 5A and 5B are communicated with each other via a communicating portion 5C that has a sufficient large cross-sectional opening area.

Figure 2:
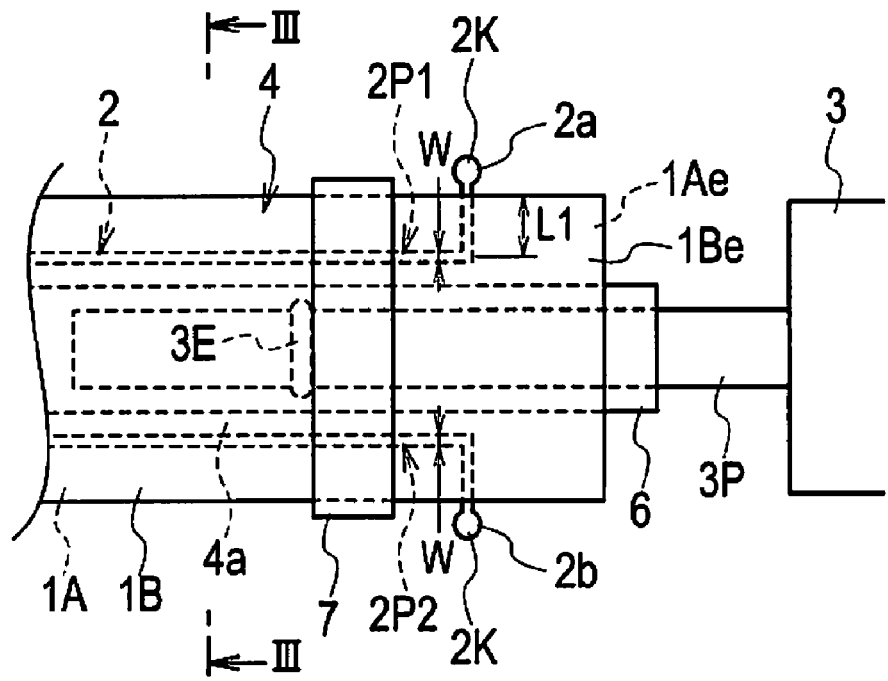
FIG. 2 shows an enlarged view of a portion II shown in FIG. 1.

As shown in FIG. 2, the gas introducing portion 4 is provided at extending portions 1Ae and 1Be each extends from an upper rear end of the rear inflating portion 5B and has a predefined width. The extending portion 1Ae integrally extends from the first base fabric 1A and the extending portion 1Be from the second base fabric 1B. Ends of the extending portions 1Ae and 1Be form an opening of the gas introducing portion 4.

When pasting adhesive agent 2, one of the base fabrics 1A and 1B (for example, the first base fabric 1A) is expanded with being spread on a working table (not shown). Pasting the adhesive agent 2 is started at an upper edge (upper side in FIG. 2) near the end of the extending portion 1Ae. Subsequently, pasting is continued along a circumferential edge of the inflating portion 5 to form the rear inflating portion 5B and the front inflating portion 5A. At the end, pasting is finished at a lower edge (lower side in FIG. 2) near the end of the extending portion 1Ae. Here a start point of pasting the adhesive agent 2 is a pasting start point 2a (a terminal end of a pasting end 2P1) and an end point thereof is a pasting end point 2b (a terminal end of another pasting end 2P2).

In the present embodiment, the pasting start portion (the pasting end) 2P1 and the pasting end portion (the other pasting end) 2P2 are made at the gas introducing portion 4 in this manner. Then, the second base fabric 1B is put on the first base fabric 1A to adhere the base fabrics 1A and 1B together after pasting the adhesive agent 2 on the first base fabric 1A. As a result, the gas introducing portion 4 with the path 4a and the inflating portion 5 are formed as mentioned above. Note that it is preferable to sew up along the adhered portion after adhering the base fabrics 1A and 1B.

Here, the pasting start point 2a and the pasting end point 2b are located outside the path 4a of the gas introducing portion 4. Specifically, the pasting start point 2a and the pasting end point 2b are located outward from each pasting width W of the pasting start portion 2P1 and the pasting end portion 2P2 when pasting the adhesive agent 2, as shown in FIG. 2.

Especially, the pasting start point 2a and the pasting end point 2b are located outside of the base fabric 1A when locating the pasting start point 2a and the pasting end point 2b outward from the pasting widths W, as shown in FIG. 2. In other words, pasting of the adhesive agent 2 is started at a point outside (upper side in FIG. 2) the first base fabric 1A (the pasting start point 2a) and then continued from the pasting start point 2a to run on the base fabric 1A by a predefined amount L1. Subsequently, the pasting is continued along the circumferential edge of the inflating portion 5 and the path 4a and then terminated at a point outside (lower side in FIG. 2) the first base fabric 1A (the pasting end point 2b) that is located outward from the circumferential edge of the base fabric 1A. Note that an area between the pasting start portion 2P1 and the pasting end portion 2P2 on the first base fabric 1A is to form the path 4a in the present embodiment.

Figure 3:
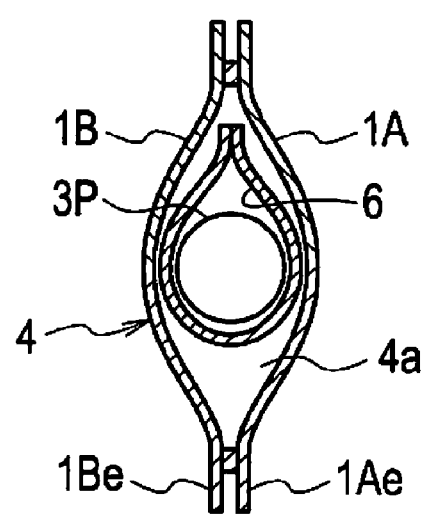
FIG. 3 shows a cross-sectional view taken along a line III-III shown in FIG. 2.

As shown in FIG. 3, at the gas introducing portion 4, a tubular inner cloth 6 having a predefined length is interposed between the base fabrics 1A and 1B on adhering the base fabrics 1A and 1B together with the adhesive agent 2. Here, a rear end of the inner cloth 6 is slightly projected from the rear ends of the extending portions 1Ae and 1Be that form the gas introducing portion 4.

The inner cloth 6 functions as a guide member for guiding the gas introducing pipe 3P while inserting the gas introducing pipe 3P into the gas introducing portion 4. The inner cloth 6 also functions to facilitate flowing of gas injected from the inflator 3 toward the inflating portion 5. In addition, an inner diameter of the gas introducing pipe 3P is determined based on an amount and an pressure of gas to be injected from the inflator 3 and each inner width of the gas introducing portion 4 and the inner cloth 6 is determined according to the determined inner diameter of the gas introducing pipe 3P.

As shown in FIG. 2, the gas introducing portion 4 is bound up with a belt 7 at a point on a side of the inflating portion 5 from the pasting start/end points 2a and 2b after inserting the gas introducing pipe 3P into the gas introducing portion 4 to fix the gas introducing portion 4 and the gas introducing pipe 3P together and to seal between the gas introducing portion 4 and the gas introducing pipe 3P. In addition, a bulge 3E is formed at an intermediate point of the gas introducing pipe 3P. The bulge 3E is to be located at a point on a side of the inflating portion 5 from the bind-up point by the belt 7. Therefore, it can be prevented for the curtain airbag 1 to drop off from the gas introducing pipe 3P on the curtain airbag 1 developing due to a stick between the bind-up portion by the belt 7 and the bulge 3E.

In the present embodiment, since the pasting start portion 2P1 and the pasting end portion 2P2 are located at the gas introducing portion 4 and the pasting start point 2a and the pasting end point 2b are located outside of the path 9a (i.e., located outward form each pasting width W of the pasting start portion 2P1 and the pasting end portion 2P2), it can be prevented that lumps 2K (see FIG. 2) of the adhesive agent 2 are not located within the path 4a of the gas introducing portion 4 even when the lumps 2K were made at the pasting start point 2a and the pasting end point 2b. Therefore, it can be prevented that an opening width of the gas introducing portion 4 is narrowed. As a result, the lumps 2k don't infect the insertion of the gas introducing pipe 3P into the gas introducing portion 4 and smooth insertion workability of the gas introducing pipe 3P can be secured.

In addition, since the pasting start point 2a and the pasting end point 2b are located outside of the base fabrics 1A and 1B, the lumps 2K of the adhesive agent 2 don't exist on the curtain airbag 1 at all. Therefore, improved appearance of the curtain airbag 1 can be secured in addition to the smooth insertion workability of the gas introducing pipe 3P.

Further, since the pasting of the adhesive agent 2 is started at a point located outside of the base fabric 1A and the pasting is terminated at a point located outside of the base fabric 1A, it is not needed to control a pasting amount and so on at the pasting start point 2a and the pasting end point 2b on pasting the adhesive agent 2 through machine operations. As a result, each pasting width W of the pasting start portion 2P1 and the pasting end portion 2P2 (i.e., the width of the path 4a) can be kept constant. Therefore, the smooth insertion workability of the gas introducing pipe 3P can be secured from this aspect.

Although the preferable embodiment is indicated as described above, the present invention is not limited to the above embodiment. Its configuration can be replaced with another configuration within the scope of the present invention.

For example, the curtain airbag 1 is adopted as an airbag in the above embodiment. However, an airbag according to the present invention is not limited to a curtain airbag. The present invention can be applied to another type of an airbag.

In addition, the pasting start/end points 2a and 2b can be set reversely to reverse the pasting direction of the adhesive agent 2.

Further, it can be adopted that the first base fabric 1A is put on the second base fabric 1B to adhere the base fabrics 1A and 1B together after pasting the adhesive agent 2 on the second base fabric 1B.

Furthermore, only the gas introducing pipe (gas introducing member) 3P is inserted into the gas introducing portion 4 in the above embodiment. However, not only the gas introducing pipe 3P but also an inflator (gas generator) itself can be inserted directly into the gas introducing portion 4. In this case, the inflator itself is the gas introducing member.

Furthermore, the airbag 1 is formed by adhering the two base fabrics 1A and 1B together in the above embodiment. However, the present invention can be applied to an airbag formed by folding back one base fabric, an airbag formed of three or more base fabrics and so on.

Furthermore, both of the pasting start/end point 2a and 2b of the adhesive agent 2 are located outside of the base fabrics 1A and 1B in the above embodiment. However, only one of them may be located outside of base fabrics or both of them may be located on base fabrics.

What is claimed is:

1. An airbag device with an airbag that lacks a constricting lump of adhesive agent near a gas introducing end, comprising:
    a gas introducing portion in which a path is formed, to accommodate insertion of a gas introducing member into a terminal end thereof; and
    an inflating portion communicated with the gas introducing portion, wherein
    the airbag is formed of first and second base fabrics that adhere together with an adhesive agent pasted along a circumferential edge of the inflating portion and the path, and
    a pasting end of the adhesive agent is positioned at the terminal end and located laterally outside the circumferential edge, thereby avoiding formation of a lump on the circumferential edge.

2. The airbag device according to claim 1, wherein
    the terminal end of the pasting portion is located outside at least one of the first and second base fabrics.

3. A production method of an airbag device with an airbag that includes a gas introducing portion in which a path is formed, a gas introducing member being to be inserted into the path, and an inflating portion communicated with the gas introducing portion, and the airbag is formed of first and second base fabrics that are adhered together with an adhesive agent pasted along a circumferential edge of the inflating portion and the path, the production method comprising;
    setting a pasting end of the adhesive agent at the gas introducing portion, the pasting end being to be one of a pasting start portion and a pasting end portion of the adhesive agent,
    starting, when the pasting end of the adhesive is the pasting start portion, pasting of the adhesive agent from a position outside the circumferential edge, thereby avoiding formation of a lump on the circumferential edge to form the path on one of the first and second base fabrics on which the adhesive agent is to be pasted with respect to a direction of the path, and
    terminating, when the pasting end of the adhesive is the pasting end portion, pasting of the adhesive agent at a position outside the circumferential edge to form the path on one of the first and second base fabrics on which the adhesive agent is pasted with respect to a direction of the path.

4. The production method according to claim 3, wherein at least one of the pasting start portion and the pasting end portion that is set as the pasting end at the gas introducing portion is located outside at least one of the first and second base fabrics.

5. An airbag apparatus, comprising:
    a gas introducing portion having a path, a gas introducing member inserted into the path; and
    an inflating portion communicating with the gas introducing portion, comprising an airbag formed of first and second base fabrics that are combined with an adhesive agent pasted along a circumferential edge of the inflating portion and the path, and wherein
    a pasting start point of the adhesive agent and a pasting end point of the adhesive agent are located outside the fabrics and outside the circumferential edge.

6. The airbag apparatus of claim 5, wherein the pasting start point and the pasting end point are located laterally from the circumferential edge of the base fabric.

* * * * *